United States Patent [19]
Letchworth et al.

[11] 3,810,989
[45] May 14, 1974

[54] CONTROL OF CONFUSED FLOUR BEETLES USING GERANYL PHENYL ETHERS

[75] Inventors: Peter E. Letchworth, Mountain View; Julius J. Menn, Saratoga; Ferenc M. Pallos, Pleasant Hill, all of Calif.

[73] Assignee: Stauffer Chemical Company, Westport, Conn.

[22] Filed: Aug. 10, 1972

[21] Appl. No.: 279,589

Related U.S. Application Data

[63] Continuation-in-part of Ser. No. 90,067, Nov. 16, 1970, abandoned.

[52] U.S. Cl. .............................................. 424/278
[51] Int. Cl. ................................... A01n 9/28
[58] Field of Search .................................. 424/278

[56] References Cited
UNITED STATES PATENTS
3,513,176  5/1970  Andrews et al............... 260/240 X

OTHER PUBLICATIONS

Bowers et al., Science, Vol. 142, pp. 1,469–1,470, 1963.

Schneiderman et al., J. Insect Physiol., Vol. 11, pp. 1,641–1,649, 1965.

Borkduac, "Insect Chemosterilant," pp. 61–63, Interscience Publishers, Inc., N.Y., 1966.

Bowers et al., Science, Vol. 164, pp. 323–325, 1969.

*Primary Examiner*—Albert T. Meyers
*Assistant Examiner*—Douglas W. Robinson
*Attorney, Agent, or Firm*—Daniel C. Block

[57] ABSTRACT

A method of controlling stored grain insects is described herein. Specifically, the method comprises adding an effective amount to the habitat of the stored grain insects, specifically, confused flour beetle, an effective amount of the following compound:

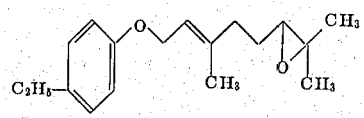

1 Claim, No Drawings

CONTROL OF CONFUSED FLOUR BEETLES USING GERANYL PHENYL ETHERS

CROSS REFERENCE TO RELATED APPLICATION

This application is a continuation-in-part of application Ser. No. 90,067, filed Nov. 16, 1970, now abandoned, entitled "Process Of Controlling Stored Grain Insects."

DESCRIPTION OF THE INVENTION

Among the several insecticide compositions, certain phenyl geranyl ethers and their epoxide derivatives have drawn considerable amount of attention. It has been found that this class of compounds acts in a different manner on insects than presently used insecticides and exerts a disrupting influence upon the normal development of insects. Such compounds impede the metamorphosis of the normal pupation of pest insects and result in the formation of members of the treated species which are non-viable or sterile. This ultimately leads, indirectly at least, to the destruction of the pest population.

The above class of compounds are described and claimed in copending patent application Ser. No. 856,140, filed Sept. 8, 1969, entitled "Certain Geranyl Phenyl Ethers And Their Epoxides And Their Use In Controlling Insects." This patent application is directed to novel chemical compounds for controlling insects along with the method of application of the compounds in addition to method of preparing the end products of the invention. The subject matter of this patent application is incorporated herein by reference.

It has been found that one of the compounds described above has unique properties in the control of insects in stored products, namely, confused flour beetle. Thus, a phenyl geranyl ether has been prepared in accordance with the procedures as outlined in the above-referred to patent application, which has the following formula:

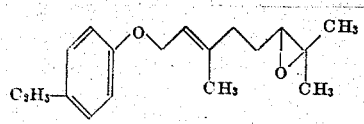

This compound has been found to have unique properties in the control of insects in stored products. The compound of this invention can be made by the following reaction:

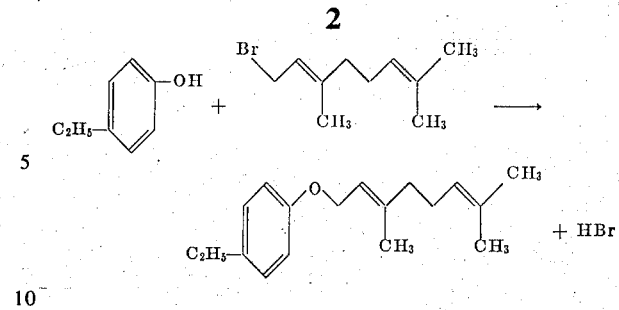

This reaction can be carried out in a solvent, with stirring and slow addition of an acid acceptor. After stripping, the above reaction product is treated with an epoxidizing agent to form the compound

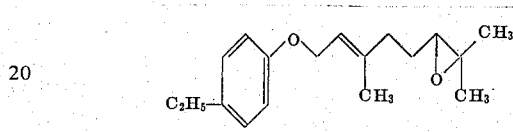

Thus, the compound was tested on a representative stored product pest, the confused flour beetle, Tribolium confusm, to demonstrate the feasibility of pest population management by means of hormonal action. Twenty adult beetles were placed in a glass bottle containing 100 g. flour. The compound of the present invention was thoroughly pre-mixed with the flour in concentrations ranging between 0.01 to 100 ppm. Untreated flour was used as a control. Results of these tests are reported in the following table. Adult development of Tribolium confusum was completely arrested when exposed to flour treated at 10ppm and higher. Premature death of adults was observed even at the lowest test concentration of 0.01 ppm. Survival of the original 20 adults at the highest test concentration (1,000 ppm) eliminated the possibility of direct toxicity of the compound to the test insects.

TABLE 1

Effect of Compound on Tribolium confusum Populations Grown in Treated Flour

| Life Stages Present 120 Days After Treatment | Concentration in Flour (ppm) | | | | | | |
|---|---|---|---|---|---|---|---|
| | 0 | .01 | .1 | 1 | 10 | 100 | 1000 |
| Adults: No. Alive | 600 | 286 | 180 | 57 | 20 | 20 | 19 |
| No. Dead | 6 | 264 | 120 | 93 | 0 | 0 | 1 |
| Pupae | +++ | +++ | +++ | +++ | +++ | + | 0 |
| Larvae | +++ | +++ | +++ | +++ | +++ | + | + |
| Supernumerary Larvae | 0 | 0 | 0 | + | +++ | +++ | ++ |
| Adult-Pupal Intermediates | 0 | 0 | 0 | 0 | + | ++ | 0 |

0 = none
+ = few
++ = moderate
+++ = many

As can be seen from the above, the compound of the present invention has unique properties in the control of insects in stored products.

What is claimed is:

1. A method of arresting the adult development of confused flour beetles comprising contacting said confused flour beetles with an effective amount for arresting the adult developement of said beetles of a compound of the formula:

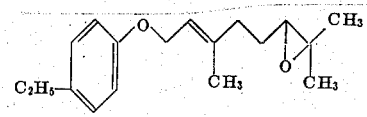

* * * * *